United States Patent
Liebau (10) Patent No.: US 11,192,284 B2
(45) Date of Patent: Dec. 7, 2021

(54) METHOD FOR PRODUCING A PLASTIC COMPONENT BY MEANS OF AN INJECTION MOULDING PROCESS

(71) Applicant: EuWe Eugen Wexler Holding GmbH & Co. KG, Lauf a. d. Pegnitz (DE)

(72) Inventor: Burkhard Liebau, Nuremberg (DE)

(73) Assignee: EuWe Eugen Wexler Holding GmbH & Co. KG, Lauf a.d. Pegnitz (DE)

( * ) Notice: Subject to any disclaimer, the term of this patent is extended or adjusted under 35 U.S.C. 154(b) by 392 days.

(21) Appl. No.: 15/123,417

(22) PCT Filed: Mar. 12, 2015

(86) PCT No.: PCT/DE2015/000112
§ 371 (c)(1),
(2) Date: Sep. 2, 2016

(87) PCT Pub. No.: WO2015/135522
PCT Pub. Date: Sep. 17, 2015

(65) Prior Publication Data
US 2016/0368190 A1    Dec. 22, 2016

(30) Foreign Application Priority Data

Mar. 14, 2014 (DE) .......................... 102014103501.1

(51) Int. Cl.
*B29C 45/00* (2006.01)
*B29C 45/56* (2006.01)
*B29L 31/30* (2006.01)

(52) U.S. Cl.
CPC .......... *B29C 45/0081* (2013.01); *B29C 45/56* (2013.01); *B29L 2031/3038* (2013.01)

(58) Field of Classification Search
CPC ................. B29C 45/0081; B29C 45/56; B29L 2031/3038

(Continued)

(56) References Cited

U.S. PATENT DOCUMENTS 5,133,473 A * 7/1992 Piltz ................... B65D 17/4012
                                                    220/270
5,776,522 A    7/1998 Budnick
6,612,607 B1 * 9/2003 Takahashi ........... B29C 45/0081
                                                    280/728.2

(Continued)

FOREIGN PATENT DOCUMENTS

CN    1220637 A    6/1999
DE    19738493 A1    3/1998

(Continued)

OTHER PUBLICATIONS

English Translation of Written Opinion in related International Application No. PCT/DE2015/000112 filed Mar. 12, 2015, 7 pages.

(Continued)

*Primary Examiner* — Jacob T Minskey
*Assistant Examiner* — Elisa H Vera
(74) *Attorney, Agent, or Firm* — Rimôn, P.C.

(57) ABSTRACT

Method for producing a plastic component by an injection moulding process, which plastic component comprises a main body that includes at least one component section being a predetermined breaking region having a wall thickness smaller than the other sections of the main body. The method comprises: injecting a plasticized plastic compound into a mould cavity of an injection mould for forming the main body, the mould cavity being dimensioned so the region on the main body in which the component section is to be formed is formed with an excess wall thickness, moving at least one sliding element on the injection mould against the region on the main body in which the component section is to be formed in order to form the component section so that the wall thickness is smaller than the other sections of the main body, cooling and removing the plastic component from the mould cavity.

7 Claims, 4 Drawing Sheets

(58) Field of Classification Search
USPC .................................................. 264/328.7
See application file for complete search history.

(56) References Cited

U.S. PATENT DOCUMENTS

| | | | |
|---|---|---|---|
| 2002/0079676 A1 | 6/2002 | Ueno et al. | |
| 2005/0082808 A1* | 4/2005 | Wildig | B60R 21/13 280/756 |
| 2006/0034974 A1* | 2/2006 | Hashimoto | B29C 33/44 425/556 |
| 2009/0288542 A1* | 11/2009 | Matsuno | B60R 21/2165 83/879 |
| 2011/0062685 A1* | 3/2011 | Kim | B29C 44/1238 280/728.3 |
| 2012/0025506 A1* | 2/2012 | Beierl | B60R 21/13 280/756 |
| 2013/0026677 A1 | 1/2013 | Smith | |
| 2013/0249195 A1* | 9/2013 | Hagi | B29C 37/0057 280/728.3 |

FOREIGN PATENT DOCUMENTS

| | | |
|---|---|---|
| DE | 19804999 A1 | 8/1999 |
| DE | 69602791 T2 | 2/2000 |
| DE | 69615091 T2 | 6/2002 |
| DE | 10234198 A1 | 3/2003 |
| DE | 102005050370 A1 | 5/2006 |
| EP | 0904994 A1 | 3/1999 |
| EP | 1555107 A1 | 7/2005 |
| JP | 3765166 B2 | 4/2006 |
| JP | 2007098573 A | 4/2007 |
| WO | 1998049033 A1 | 11/1998 |
| WO | 2005032794 A1 | 4/2005 |
| WO | 2007042011 A2 | 4/2007 |

OTHER PUBLICATIONS

Eissmann Group Automotive, Airbagklappe Audi D4 Markteinführung 2009, CAD Drawing, Dec. 3, 2020, p. 2.

* cited by examiner

METHOD FOR PRODUCING A PLASTIC COMPONENT BY MEANS OF AN INJECTION MOULDING PROCESS

CROSS-REFERENCE TO RELATED APPLICATIONS

This application is a United States national stage application of International Application no. PCT/DE2015/000112 and filed Mar. 12, 2015, which claims priority to German Patent Application serial no. 10 2014 012 034.0 filed Mar. 14, 2014. The contents of each application are incorporated herein by reference in their entirety as if set forth verbatim.

The invention relates to a method for producing a plastic component by means of an injection molding process, which plastic component comprises a main body which comprises at least one component portion which is configured as a predetermined breaking region and which in comparison with the remaining portions of the main body has a lesser wall thickness.

It may be necessary for plastic components to be configured having component portions which have dissimilar wall thicknesses. The component portions having dissimilar wall thicknesses may be functionalized in different ways. For example, in this way it is conceivable that component portions which have particularly minor wall thicknesses serve as predetermined breaking regions which rupture upon comparatively minor forces acting thereon.

It is known that the production of corresponding plastic components by injection molding having component portions which have dissimilar wall thicknesses may represent a challenge. The reason therefore lies in particular in that the configuration of component portions which have particularly minor wall thicknesses, that is to say in particular wall thicknesses of less than 0.5 mm, is problematic in terms of filling the mold of a tool cavity on the injection molding tool.

The invention is thus based on the object of stating an improved method for producing a plastic component, which plastic component comprises a main body which comprises at least one component portion which is configured as a predetermined breaking region and which in comparison with the remaining portions of the main body has a lesser wall thickness.

The object is achieved by a method of the type mentioned at the outset, which according to the invention is distinguished by the following method steps:
injecting a plasticized plastics compound into a tool cavity of an injection molding tool, in order to configure the main body, wherein the tool cavity is dimensioned such that the main-body side region in which the component portion is to be configured is configured so as to have an oversized wall thickness;
moving at least one injection molding tool side slider element toward the main-body side region in which the component portion is to be configured, in order to configure the component portion in such a manner that the wall thickness is reduced to that wall thickness which in comparison with the remaining portions of the main body is less;
cooling and removing the plastic component from the tool cavity.

The plastic component produced or to be produced, respectively, comprises a main body. The main body defines substantially the external dimensions and the spatial design, that is to say in particular the shape, of the plastic component.

The main body comprises at least one component portion which on the finished component is configured or serves, respectively, as a predetermined breaking region. The or a component portion which is configured as the predetermined breaking region in comparison with the remaining portions of the main body has a lesser wall thickness and may be differentiated from said remaining portions in this manner. Typically, the component portion which is configured as the predetermined breaking region is that portion of the main body or of the plastic component, respectively, that has the least wall thickness.

A predetermined breaking region is understood to be a construction element which, in particular by virtue of the constructive concept thereof, that is to say in particular by virtue of the comparatively minor wall thickness thereof, in a particular stress situation, that is to say under the influence of specific forces, fails or breaks, respectively, in an intentional and targeted manner. The or a component portion which is configured as a predetermined breaking region by virtue of the comparatively lesser wall thickness is thus structurally weakened, breaking already when comparatively minor forces are applied or act thereon. Influence may be taken in a targeted manner on the forces which are required for a respective component portion to fail or break, respectively by establishing the wall thickness of the component portion which is configured as a predetermined breaking region, and the mechanical properties of the plastics material forming the plastic component, and optionally parameters such as cooling rates, for example, which are specific to the injection molding process.

It is self-evident that the main body moreover may have other or further, respectively, functionalized component portions, for example in the form of fastening elements, by way of which a fastening of the plastic component to a third-party item is possible, or in the form of reinforcement elements by way of which an increase in the mechanical stability, that is to say in particular the rigidity, of the plastic component is possible.

In a first step of the method according to the invention, injecting a plasticized plastics compound, that is to say a plastics melt, into a tool cavity of an injection molding tool, in order to configure the main body, is performed, wherein the tool cavity is dimensioned such that the main-body side regions in which respective component portions which are configured or serve as predetermined breaking regions, respectively, are to be configured, are each configured having a specifically oversized wall thickness.

The injection molding tool which is used within the scope of the method according to the invention thus has a tool cavity which does not exactly or completely, respectively, mirror the final dimensions of the plastic component to be produced. In the tool-cavity side regions in which respective component portions which serve as a predetermined breaking point are to be configured the tool cavity is oversized in terms of the nominal wall thickness of these component portions on the finished component. Accordingly, the main body which is configured in the first step of the method according to the invention in the regions in which the component portions which furthermore serve as predetermined breaking regions are configured, after filling of the tool cavity, have a temporarily existing oversized wall thickness. An oversized wall thickness is to be understood in particular that the wall thickness in this region exceeds the envisaged nominal wall thickness of the component portions which serve as predetermined breaking regions.

Filling of the tool cavity within the scope of injecting the plasticized plastics compound in this manner within the scope of the method according to the invention is readily possible since said filling in terms of process technology is delinked from the configuration of respective component portions having particularly lesser wall thicknesses, that is to say typically wall thicknesses of less than 0.5 mm.

The tool cavity used may be dimensioned such that the main-body side regions in which respective component portions which serve as a predetermined breaking region are to be configured are configured having an oversized wall thickness, wherein the oversized wall thickness of the main-body side regions in which the component portions which serve as a predetermined breaking region are to be configured is less than the wall thickness of the remaining portions of the main body. The oversized wall thickness in absolute terms thus is typically between the wall thickness of the remaining portions of the main body and the nominal wall thickness of respective component portions on the finished component which serve as predetermined breaking regions.

In a second step of the method according to the invention, moving at least one injection molding tool side slider element toward the main-body side region in which the component portion is to be configured is performed, in order to configure the component portion in such a manner that the wall thickness is reduced to that wall thickness which in comparison with the remaining portions of the main body is less. The component portions which serve as predetermined breaking regions are thus configured in the second step of the method according to the invention.

To this end, respective slider elements, that is to say in particular sliding dies, which by way of a suitable injection molding tool side drive installation may be moved from an initial position to a terminal position, are provided at the injection molding tool side. The slider elements in the initial position are typically retracted, not protruding, or in comparison with the terminal position protruding only slightly from a surface of the injection molding tool which delimits the tool cavity, or from a mold half which is associated therewith, respectively. Accordingly, the slider elements in the terminal position are typically deployed, at least in portions protruding from a surface of the injection molding tool which delimits the tool cavity, or from a mold half which is associated therewith, respectively. Thus, the slider elements in the terminal position generally protrude farther from a surface of the injection molding tool which delimits the tool cavity, or from a mold half which is associated therewith, respectively.

By way of the movement of respective slider elements, which is controlled in a defined manner and which may also be referred to or considered as a stroke, respectively, toward the main body which self-evidently is still in a plastic state and thus deformable, plasticized plastics material is displaced from the main-body side regions in which the component portions which serve as predetermined breaking regions are configured. It has been demonstrated that this does not lead to plasticized plastics material being pushed from the tool cavity. Rather, by way of the displacement of plastics material from the regions in which component portions which serve as predetermined breaking regions are configured, a compression of material in the remaining portions of the main body results, said compression in terms of the properties of the finished plastic component not being disadvantageous, however. In particular, this does not impair the visual impression of the plastic component.

In a last step of the method according to the invention, cooling of the plastic material and finally removing of the finished plastic component from the tool cavity or from the injection molding tool, respectively, is performed. In order for the finished plastic component to be removed from the tool cavity or from the injection molding tool, respectively, suitable gripper devices, robots, etc. may be employed.

The method according to the invention represents a reliable principle for producing a plastic component having component portions having dissimilar wall thicknesses, said principle being implementable in a comparatively simple manner and thus being improved. In particular, component portions having comparatively minor wall thicknesses, that is to say wall thicknesses of less than 0.5 mm, may be readily produced using the method according to the invention.

The movement of the slider elements toward the main body is expediently performed at the commencement of the holding pressure phase of the injection molding process, and/or during said holding pressure phase. In this manner, it is possible for the cycle time of the injection molding process to not be unnecessarily extended.

The free end of the slider element or slider elements, or of specific injection molding tool side slider elements, which is moved toward the main body is expediently provided with an oblique face. The oblique face is typically formed by splaying the free end of a respective slider element. The oblique face necessitates corresponding chamfering of the plastic component in the component portions which serve as a predetermined breaking point or of corresponding transitional regions in respective component portions which serve as a predetermined breaking point. Chamfering of the plastic component in functional and constructive terms represents a notch which in the case of forces acting thereon causes a notch effect or amplifies the latter, respectively, and thus facilitates the breaking properties of the component portions which serve as predetermined breaking regions.

Beside the component portion which is configured as the predetermined breaking region, at least one further component portion which is configured or serves, respectively, as an integral hinge can be configured, wherein the wall thickness of the further component portion which is configured as the integral hinge is between the wall thickness of the component portion which is configured as the predetermined breaking region and the wall thickness of the remaining portions of the main body. Respective component portions which are configured or serve, respectively, as an integral hinge are typically configured in the first step of the method according to the invention, and thus collectively with the main body. The wall thickness of respective component portions which serve as an integral hinge is chosen such that said wall thickness poses no problems in terms of complete filling of the tool cavity in the first step of the method according to the invention.

Typically, the the or a component portion which is configured as the predetermined breaking region, and the or a component portion which is configured as the integral hinge, collectively delimit a main-body side flap region. The flap region in functional terms serves for preventing that fragments of the main body may be detached in an uncontrolled manner from the main body in the case of the predetermined breaking regions being ruptured. In this case, the flap region rather is folded out or pivoted out, respectively, about a flapping axis or pivoting axis, respectively, which is defined by the component portion which serves as the integral hinge.

The or a component portion which is configured as the predetermined breaking region may be configured in a U-shape, for example. The U-shape of respective component portions which serve as a predetermined breaking region is expedient in particular in terms of the afore-described delimitation of a flap region. The flap region may thus be configured so as to be (substantially) rectangular, or having a (substantially) rectangular basic shape, respectively. Self-evidently, the shape of respective component portions is to be fundamentally established in terms of specific functional as well as constructive parameters of the plastic component.

For example, the following wall thicknesses or ranges of wall thickness, respectively, are provided. The component portion which is configured as the predetermined breaking region is configured having a wall thickness in a range between 0.1 and 0.4 mm, and the remaining portions of the main body, except for an optionally present portion which is configured as an integral hinge, are configured having a wall thickness which is in a range between 1 and 3 mm, in particular of 2.5 mm. The or a component portion which is configured as an integral hinge, if and when present, is configured having a wall thickness in a range between 0.6 and 0.9 mm, in particular of 0.8 mm. Exceptions having deviations in the wall thicknesses to the higher and/or lower side may self-evidently be provided.

Typically, at least one thermoplastics material or polymer, respectively, is used as the plasticized plastics compound. This includes, in particular, polyolefin or aliphatic plastics materials. The use of technical plastics such as, for example, ABS and/or PC is preferable. The plastics materials may contain specific fillers, such as reinforcing fibers, for example. Mixtures of chemically dissimilar plastics materials, so-called blends, may self-evidently be used.

The plastic component produced by the method according to the invention is in particular a covering element for covering a part of a vehicle body that is equipped with at least one airbag and/or a roll bar. Such a covering element may be a cross beam, for example, which is to be installed in the region of the rear of the cabin of a motor vehicle, in particular of a convertible, so as to be transverse to the longitudinal vehicle axis. The component portions which serve as predetermined breaking regions in the installed state of the plastic component in relation to the airbags and/or roll bars on the vehicle body side are disposed in such a manner that said airbags and/or roll bars in the event of a collision of the motor vehicle are moved toward the covering element in such a manner that the predetermined breaking regions break.

The invention also relates to a plastic component which is produced according to the aforedescribed method according to the invention. All explanations referring to the method according to the invention apply in an analogous manner to the plastic component according to the invention.

The plastic component according to the invention is thus in particular a covering element for covering a part of a vehicle body that is equipped with at least one airbag and/or a roll bar.

Further advantages, features, and details of the invention are derived from the exemplary embodiment which is described hereunder, and by means of the drawings in which.

Figure 1:
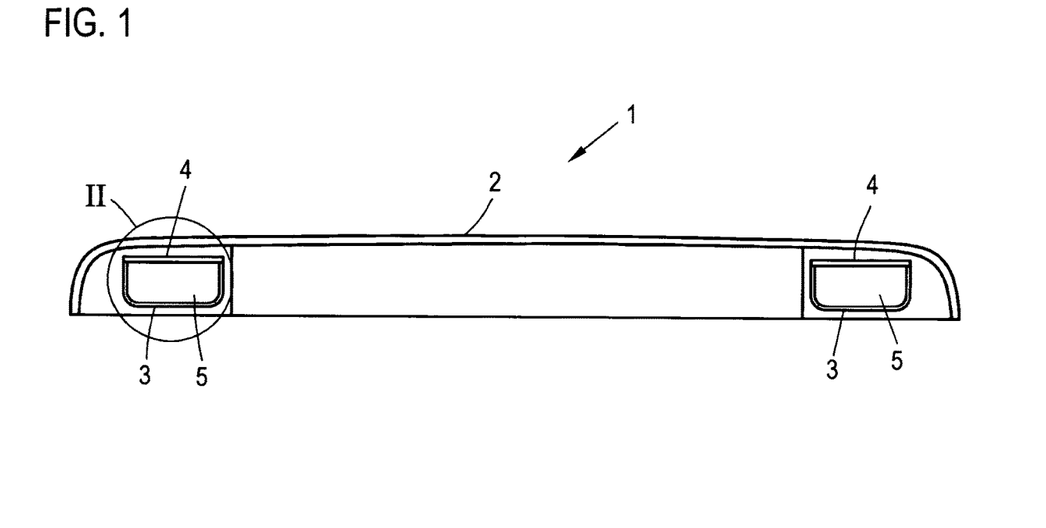
FIG. 1 shows a plastic component according to one exemplary embodiment of the invention.

FIG. 1 shows a plastic component 1 according to one exemplary embodiment of the invention. Herein, FIG. 1 shows a view of the non-visible side, or of the rear side, respectively, of the plastic component 1. The visible side of the plastic component 1 at least in portions may be obscured by at least one decorative element, such as a film, for example.

The plastic component 1 is a covering element for covering a part of a vehicle body that is equipped with at least one airbag and/or a roll bar. Such a covering element may be a cross beam, for example, which is to be installed in the rear of the cabin of a motor vehicle, in particular of a convertible, so as to be transverse to the longitudinal vehicle axis.

The plastic component 1 comprises a main body 2. The external dimensions and the geometric design of the plastic component 1 are defined by way of the main body 2. Various functional component portions are configured or molded on the main body 2, respectively. These include, for example, fastening elements, not referred to in more detail, for fastening the plastic component 1 to a third-party item, such as the afore-mentioned vehicle body, and likewise reinforcement elements, not referred to in more detail, for increasing the mechanical stability, that is to say in particular the rigidity of the plastic component 1.

Component portions 3 which are configured or serve, respectively, as a predetermined breaking point on the main-body side, on the one hand, and component portions 4 which are configured or serve, respectively, as an integral hinge on the main-body side, are to be emphasized, as they are important for explaining the principle according to the invention. The component portions 3 which serve as a predetermined breaking point extend both in the direction of the longitudinal axis as well as in the direction of the transverse axis of the plastic component 1, thus forming the shape of a "U". The component portions 3 which serve as a predetermined breaking point are thus configured in a U-shape.

The component portions 3, 4 mentioned differ in particular in the wall thicknesses thereof from the remaining portions of the main body 2. Herein, the component portions 3 which are configured as a predetermined breaking point have the least wall thickness. The wall thickness of the component portions 3 which are configured as a predetermined breaking point is approx. 0.4 mm. As compared therewith, the component portions 4 which are configured as an integral hinge have a greater wall thickness. The wall thickness of the component portions 4 which are configured as an integral hinge is approx. 0.8 mm. The remaining portions of the main body 2 have a wall thickness of approx. 2.5 mm. The main body 2 thus has dissimilar portions or component portions, respectively, having dissimilar wall thicknesses.

As can be seen, respective component portions 3 which serve as a predetermined breaking point, collectively with respective component portions 4 which serve as an integral hinge, delimit respective flap regions 5 on the main-body side. The task and the function of the flap regions 5 lies in preventing fragments of the main body 2 being detached in an uncontrolled manner from the main body 2 in the case of the predetermined breaking regions being ruptured. In this case, the flap region 5 rather is folded out or pivoted out, respectively, about respective flapping axes or pivoting axes, respectively, which are defined by the component portions 4 which serve as an integral hinge.

In the installed state of the plastic component 1, in which the plastic component 1 is connected with a vehicle body in an orderly manner, the flap regions 5 are disposed above respective airbags and/or roll bars which are provided on the vehicle-body side. In some instances, the component portions 3 which serve as predetermined breaking regions, in the installed state of the plastic component 1, are disposed in relation to the airbags and/or roll bars on the vehicle-body side in such a manner that said airbags and/or roll bars in the event of a collision of the motor vehicle are moved toward the plastic component 1, that is to say in particular toward the flap regions 5, in such a manner that the predetermined breaking regions break.

In the event of a collision of the motor vehicle, the airbags or roll bars, respectively, are activated or ignited, respectively, by suitable installations, for example pyrotechnically, and within a split second accelerated toward the flap regions 5. As has been mentioned, the acceleration of the airbags or of the roll bars, respectively, toward the flap regions 5 causes the component portions 3 which serve as a predetermined breaking region, but not the remaining portions of the main body 2, that is to say in particular not the component portions 4 which serve as an integral hinge, to rupture. The flap regions 5 fold out or pivot about the flap axis or pivot axis, respectively, vacating the path for the airbags and/or roll bars through the plastic component 1.

Figure 2:
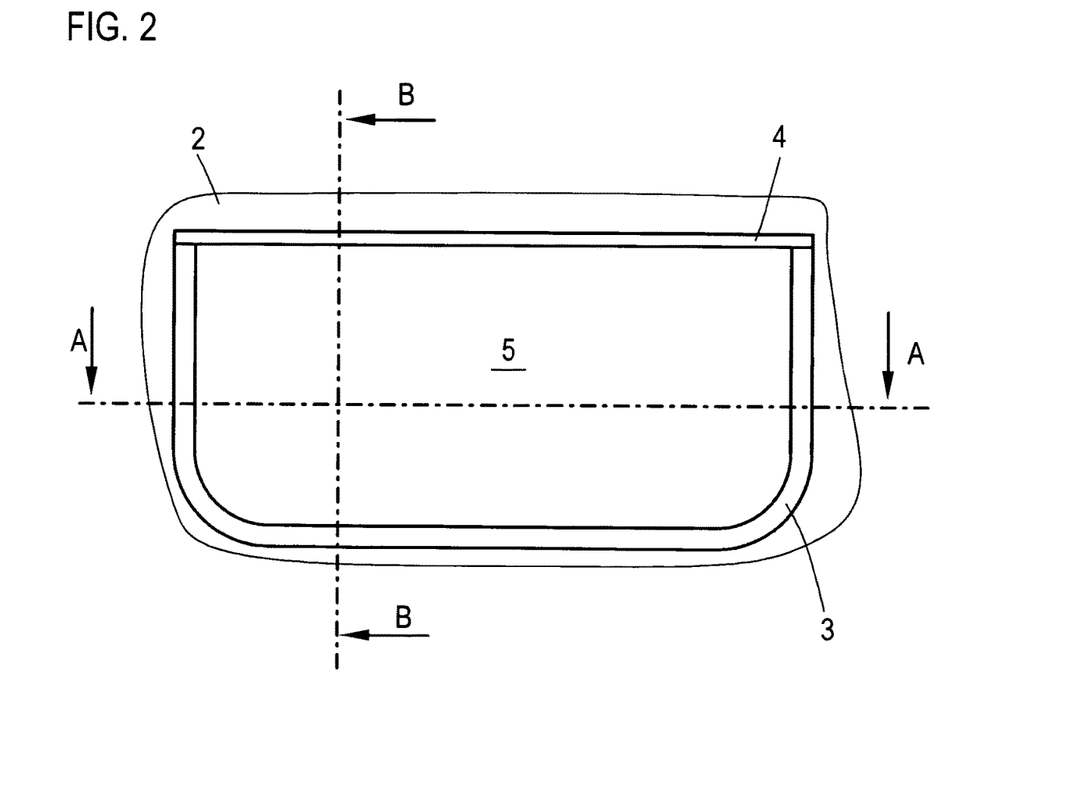
FIG. 2 shows an enlarged view of the detail II shown in FIG. 1.

FIG. 2 shows an enlarged view of the detail II shown in FIG. 1. The substantially rectangular basic shape of a flap region 5 which is delimited by a component portion 3 which serves as a predetermined breaking region, and by a component portion 4, which serves as an integral hinge, can be clearly seen by means of FIG. 2. Section lines A-A in the direction of the longitudinal axis, and section lines B-B in the direction of the transverse axis of the plastic component 1 are indicated in FIG. 2, said section lines being of importance in particular for the explanation of FIGS. 3 to 6.

The method for producing the or a plastic component 1 as has been described will be explained in more detail with reference to FIGS. 3-7, and comprises the following method steps:
  injecting a plasticized plastics compound into a tool cavity 6 of an injection molding tool 7, in order to configure the main body 2, wherein the tool cavity 6 is dimensioned such that the main-body side regions in which the component portions 3 which serve as predetermined breaking regions are to be configured are configured so as to have an oversized wall thickness;
  moving at least one injection molding tool side slider element 8 toward the main-body side region in which the component portions 3 which serve as predetermined breaking regions are to be configured, in order to configure the component portions which serve as predetermined breaking regions 4 in such a manner that the wall thickness thereof is reduced to that wall thickness which in comparison with the remaining portions of the main body 2 is less;
  cooling and removing the plastic component 1 from the tool cavity 6, respectively from the injection molding tool 7.

The method is thus carried out using an injection molding machine having an injection molding tool.

The plasticized plastics compound, which self-evidently may also be referred to as a plastics melt, is a plasticized ABS/PC blend, for example, that is to say a mixture of the two plastics materials ABS and PC which are chemically dissimilar. The temperature of the plasticized plastics compound in this exemplary case is approx. 285° C. As is known to a person skilled in this art, further parameters, such as the injection pressure, for example, are to be established in particular in terms of the specific dimensions of the plastic component 1 to be produced.

FIGS. 3 to 6 shows various steps within the scope of carrying out a method for producing a plastic component 1 according to one exemplary embodiment of the invention.

Figure 3:
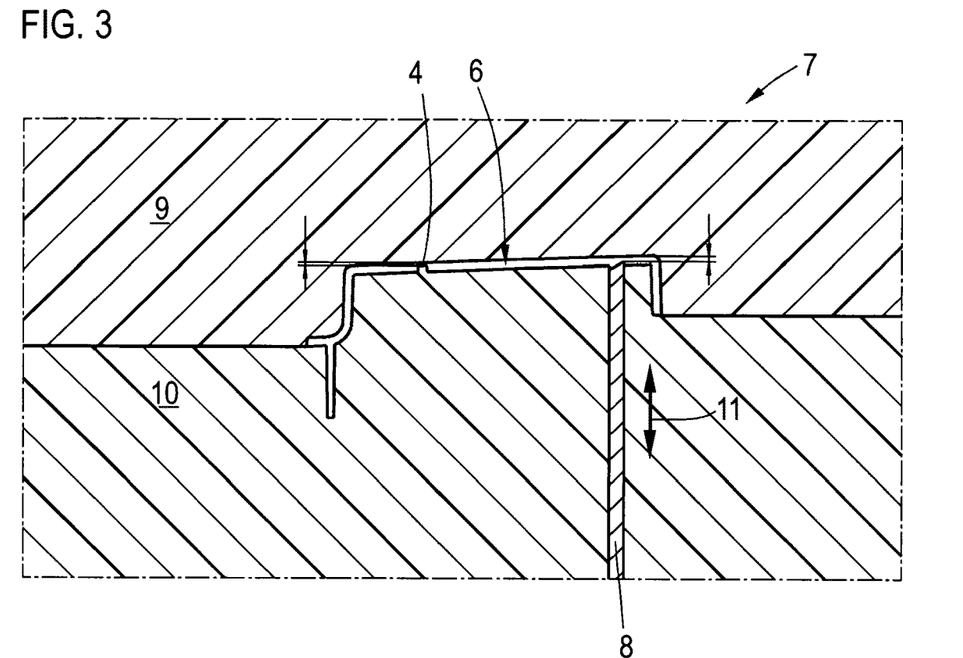
FIGS. 3-6 show various method steps within the scope of carrying out a method for producing a plastic component according to one exemplary embodiment of the invention.
Figure 4:
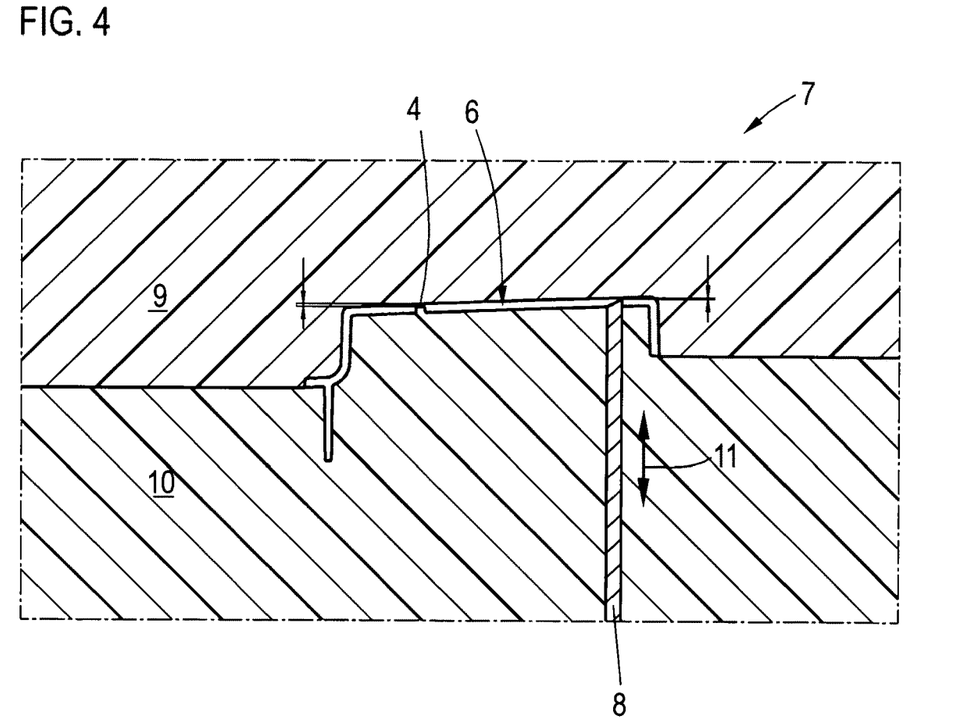
Figure 5:
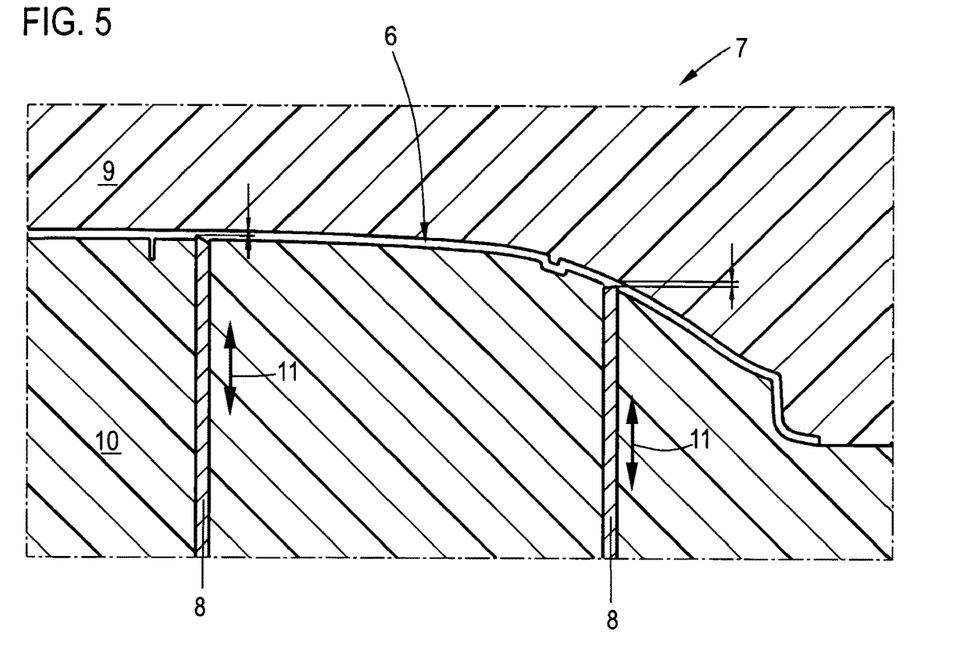
Figure 6:
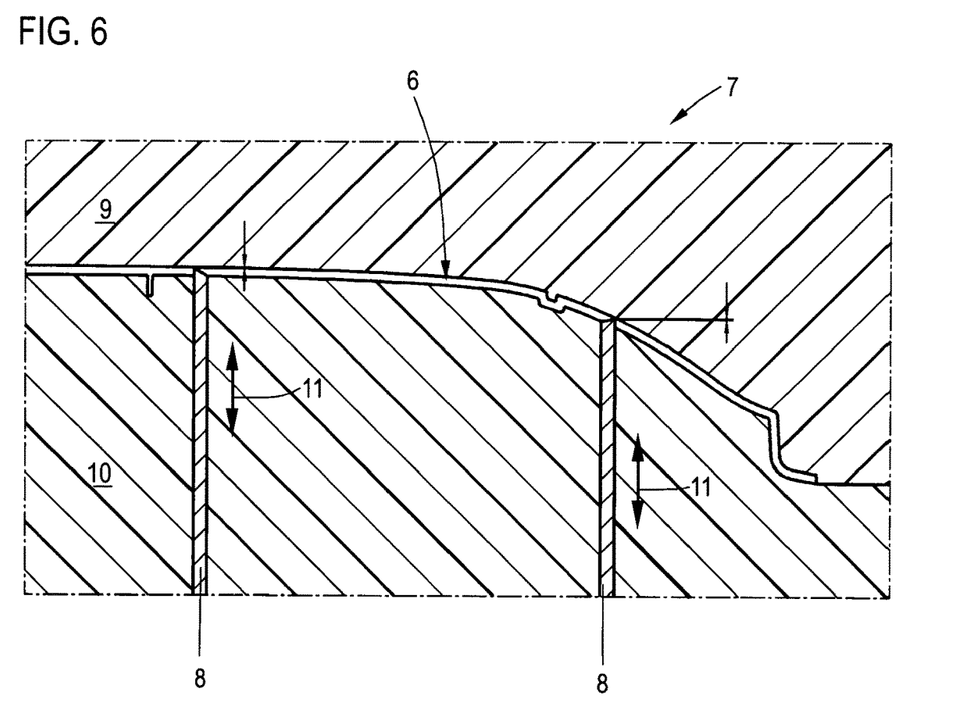

FIGS. 3 to 6 each are sectional views. FIGS. 3, 4 illustrate a sectional view corresponding to the section lines B-B shown in FIG. 2, thus illustrating a cross section, FIGS. 5, 6 illustrating a sectional view corresponding to the section lines A-A shown in FIG. 2, thus illustrating a longitudinal section.

FIGS. 3, 5 each show the injecting position of the injection molding tool 7, in which the plasticized plastics compound is or is being injected into the tool cavity, respectively. FIGS. 3, 5 thus depict the injection procedure. FIGS. 4, 6 each show the ejection position in which the finished plastic component 1 may be removed from the tool cavity 6, or from the injection molding tool 7, respectively.

As can be seen, the injection molding tool 7 has two mold halves 9, 10. The mold half 9 is disposed at the nozzle side, while the mold half 10 is disposed at the ejection side. During the injection procedure, and during a temporally subsequent holding pressure phase and optionally a cooling phase, the two mold halves 9, 10 by way of mutually opposite faces bear directly on one another, the tool cavity 6 thus being closed.

Figure 7:
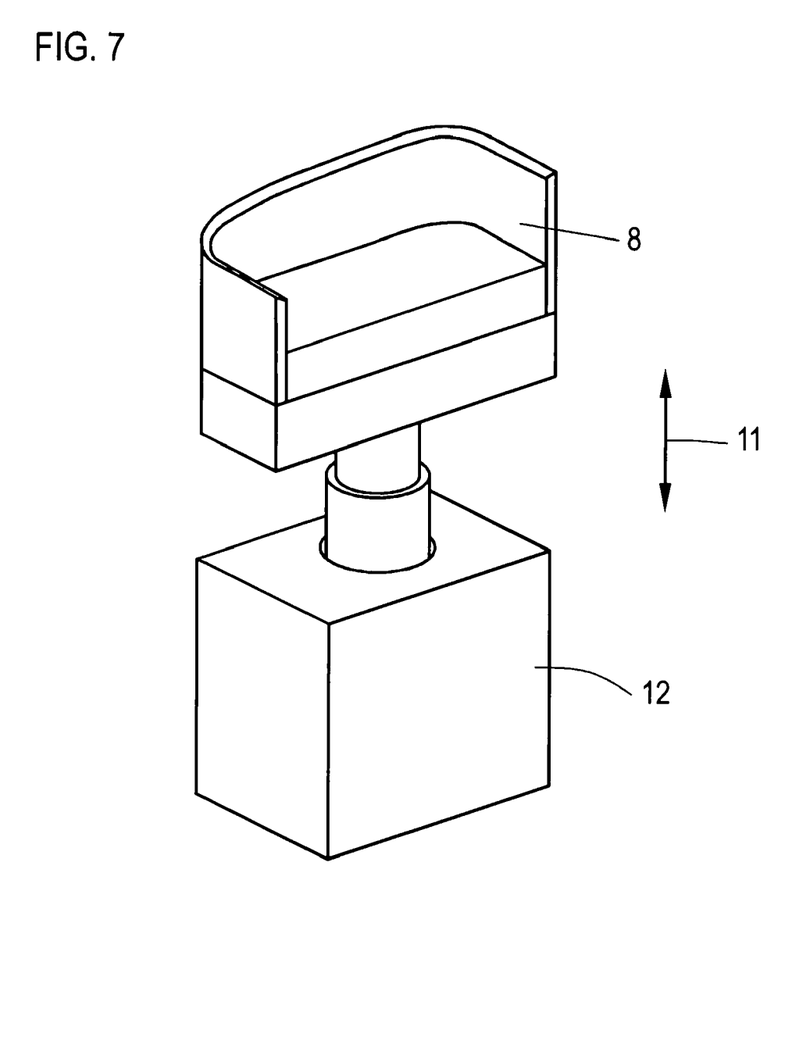
FIG. 7 shows an in-principle illustration of a slider element of an injection molding tool which is used within the scope of a method for producing a plastic component according to one exemplary embodiment of the invention.

The injection-molding tool side slider element 8 which, as is derived from FIG. 7, is configured in a U-shape so as to correspond to the profile of the component portions 3 which on the finished plastic component 1 serve as predetermined breaking regions, is disposed in the region of the ejection-side mold half 10. The movable mounting of the slider element 8 is indicated by the double arrow 11 which is shown in an exemplary manner.

The slider element 8 is coupled to a suitable, that is to say to a hydraulically controlled injection-molding tool side drive installation 12, for example, (cf. FIG. 7), by way of which the slider element 8 is movable in a defined manner from the retracted position, in short the initial position, which is shown in FIGS. 3, 5, to the deployed position, in short the terminal position, which is shown in FIGS. 4, 6, and vice-versa. The slider element 8 in the initial position is retracted and in comparison with the terminal position protrudes only slightly from a surface of the mold half 10 which delimits the tool cavity 6. Accordingly, the slider element 8 in the terminal position in comparison with the initial position protrudes farther from the surface of the mold half 10 which delimits the tool cavity 6.

As can be seen, the slider element 8 which may also be referred to or considered, respectively, as a sliding die, in the region of the free end thereof is chamfered, that is to say provided with an oblique face. The oblique face necessitates corresponding chamfering of the plastic component 1 in the component portions 3 which serve as a predetermined breaking point, or respective transitional regions in respective component portions 3, respectively. This chamfering of the plastic component 1 in portions in functional and constructive terms represents a notch which in the case of forces acting thereon causes a notch effect or amplifies the latter, respectively, and thus facilitates the breaking properties of the component portions 3 which serve as predetermined breaking regions.

It can be seen by means of FIGS. 3, 5 that the slider element 8 during injecting of the plasticized plastics compound into the tool cavity 6 is not deployed. The filling of the mold of the tool cavity 6 is readily possible since no wall thicknesses which are excessively minor and thus in terms of injection molding technology are problematic are to be implemented. The configuration of the component portion 4 which serves as an integral hinge, the wall thickness of said portion being approx. 0.8 mm, as has been mentioned, is not problematic.

Upon termination of the injection phase and of commencement of the holding pressure phase of the injection molding process, the slider element 8 is moved in a defined manner from the retracted position or initial position, respectively, shown in FIGS. 3, 5, to the deployed position or terminal position, respectively, shown in FIGS. 4, 6.

By moving the slider element 8 toward the still plastic and thus deformable main body 2, plasticized plastics material is displaced from the main-body side regions in which the component portions 3 which serve as predetermined breaking regions are configured. However, this does not lead to plasticized plastic material being urged out of the tool cavity 6. Rather, by way of the displacement of plastics material from the regions in which component portions 3 which serve as predetermined breaking regions are configured, a compression of material in the remaining portions of the main body 2 results, said compression, as mentioned above, in terms of the properties of the finished plastic component 1 not being disadvantageous, however.

FIG. 7 shows an in-principle illustration of a slider element 8 of an injection molding tool 7 which is used within the scope of a method for producing a plastic component 1 according to one exemplary embodiment of the invention.

The geometric-constructive design of a respective slider element 8 can be seen in particular by means of FIG. 7. As can be seen, the slider element 8 has the U-shape as described.

Furthermore, the coupling of the slider element 8 to a, for example hydraulic, drive installation 12 can be seen by means of FIG. 7.

The invention claimed is:

1. A method for producing a covering for at least one stored and deployable roll bar in a rear region of a motor vehicle, which covering for the roll bar comprises
    a longitudinal main body (2) configured as a cross beam for being positioned in a rear region of a cabin of a motor vehicle transverse to a longitudinal axis of the motor vehicle;
    at least two first component portions (3) which are configured as a predetermined breaking region for a deployable roll bar and which in comparison with the remaining portions of the main body (2) have a lesser wall thickness, and
    at least two second component portions (4) which are configured as an integral hinge having a wall thickness between the wall thickness of the wall thickness of the component portions (3) configured as a predetermined breaking region and the wall thickness of the remaining portions of the main body (2); wherein
    the at least two first component portions (3) and the at least two second component portions (4) define at least two irreversibly openable flap regions for covering a roll bar;

the method comprising the following steps:
    injecting a plasticized plastics compound into a tool cavity (6) of an injection molding tool (7), in order to configure the main body (2), wherein the tool cavity (6) is dimensioned such that the main-body regions in which the at least two first component portions (3) are to be configured are configured so as to have an oversized wall thickness;
    forming the at least two first component portions (3) and the at least two second component portions (4) by moving at least one injection molding tool sliding element (8) toward the main-body region in which the at least two first component portions (3) are to be configured, in order to configure the first component portions (3) in such a manner that the wall thickness is reduced to the wall thickness of the at least two first component portions (3) and the at least two second component portions; wherein the at least two first component portions (3) and the at least two second component portions (4) are formed so as to delimit the at least two flap regions (5) in the main body (2); and
    cooling and removing the covering for the deployable roll bar from the tool cavity (6).

2. The method as claimed in claim 1, characterized in that the tool cavity (6) used is dimensioned such that the main-body region in which the first component portions (3) are to be configured is configured having an oversized wall thickness, wherein the oversized wall thickness of the main-body region in which the first component portions (3) are to be configured is less than the wall thickness of the remaining portions of the main body (2).

3. The method as claimed in claim 1, characterized in that the at least one sliding element (8) is moved toward the main body (2) at the commencement of a holding pressure phase of the injection molding process, or during said holding pressure phase.

4. The method as claimed in claim 1, characterized in that the free end of the sliding element (8) which is moved toward the main body (2) is provided with an oblique face.

5. The method as claimed in claim 1, characterized in that the first component portions (3) which are configured as the predetermined breaking regions are configured in a U-shape.

6. The method as claimed in claim 1, characterized in that the first component portions (3) which are configured as the predetermined breaking region are configured having a wall thickness in a range between 0.1 and 0.4 mm, and the remaining portions of the main body (2), except for the component portions (4) which are configured as the integral hinge, are configured having a wall thickness which is in a range between 1 and 3 mm, and the component portions (4) which are configured as the integral hinge are configured having a wall thickness in a range between 0.6 and 0.9 mm.

7. The method as claimed in claim 1, characterized in that at least one thermoplastics material is used as the plasticized plastics compound.

* * * * *